United States Patent [19]

Messenger

[11] 4,208,057
[45] Jun. 17, 1980

[54] SEMI-UNITIZED SHAFT SEAL AND METHOD

[75] Inventor: Edward J. Messenger, Longview, Tex.

[73] Assignee: Garlock Inc., Longview, Tex.

[21] Appl. No.: 664,625

[22] Filed: Mar. 8, 1976

[51] Int. Cl.² .................................... F16J 15/34
[52] U.S. Cl. ............................................ 277/37
[58] Field of Search ............................ 277/35–39

[56] References Cited

U.S. PATENT DOCUMENTS

| | | | |
|---|---|---|---|
| 3,021,161 | 2/1962 | Rhoads et al. | 277/39 |
| 3,275,333 | 9/1966 | Scott et al. | 277/39 |
| 3,510,138 | 5/1970 | Bowen et al. | 277/35 |
| 3,561,770 | 2/1971 | Corsi | 277/35 |

Primary Examiner—Robert I. Smith
Attorney, Agent, or Firm—Schovee & Boston

[57] ABSTRACT

A two-part, separable, semi-unitized shaft seal for sealing between a housing bore and a relatively rotatable shaft extending through the bore and comprising a metal wear sleeve member and a sealing member assembled onto the wear sleeve member for transportation, shipping and installation of the seal as a unitized seal. However, when the housing and shaft are disassembled, one of the two seal parts remains with the housing and the other part remains with the shaft, whereby each part can be examined and replaced, if necessary, without discarding the entire seal. One seal part press-fits onto one of the housing and shaft and the other seal part forms an elastomeric interference fit on the other of the housing and the shaft.

70 Claims, 6 Drawing Figures

SEMI-UNITIZED SHAFT SEAL AND METHOD

BACKGROUND OF THE INVENTION

1. Field of the Invention

This invention relates to shaft seals and in particular to an improved, semi-unitized hub seal.

2. Description of the Prior art

Shaft seals, including unitized hub seals are well-known in the prior art. Such prior art unitized hub-type shaft seals include a wear sleeve assembly and a sealing element, the two pieces being unitized and one piece press-fitting onto the shaft and the other piece having a ridged elastomeric O.D. interference fit into the housing. Such prior art unitized seals are installed by, for example, press-fitting it onto the axle and then installing the wheel hub onto the axle and seal with the elastomeric ridges of the seal sliding into the wheel hub bore. Upon removal of the wheel, the entire unitized seal stays on the axle and can be removed from the axle and the entire seal can be replaced if necessary. The interference fit between the wheel hub and the seal O.D. resists removal of the hub therefrom and additional force must be used in removal of the hub. Other prior art unitized seals are pressed into the wheel hub bore and the entire unitized seal remains in that bore when the wheel is removed from the axle.

Such prior art unitized hub shaft seals are subject to a variety of disadvantages and problems. It is a primary object of the present invention to provide an improved hub-type shaft seal that overcomes problems in the prior art.

It is a further object of the present invention to provide a semi-unitized shaft seal which is installed as a unit but which, when the wheel hub is removed from the shaft, one seal part stays with the wheel hub and the other part stays on the axle, allowing the wheel hub to be removed from the axle without resistance from the seal. It is a still further object of the present invention to provide a two-part semi-unitized shaft seal that can be disassembled and each part examined for damage and wear, and replaced separately if necessary, in contrast to the prior art unitized seal which cannot be disassembled for inspection and which must be completely discarded and replaced if one part is damaged or worn.

It is a still further object of the present invention to provide a shaft seal having a sealing lip that runs on a smaller diameter wear surface whereby it will have a longer life than prior art shaft seals having a sealing lip that must run on a larger diameter wear surface.

It is another object of the present invention to provide a semi-unitized shaft seal with a sealing lip that more easily dissipates heat. It is a further object of the present invention to provide a semi-unitized shaft seal with a wear surface which is more accurately concentric than in the prior art shaft seals. It is a still further object of the present invention to provide a semi-unitized shaft seal that does not require an internal gasket, which gaskets are susceptable to being cut or damaged during manufacture and installation. It is another object of the present invention to provide, in certain embodiments, a semiunitized shaft seal having positive and constant lubrication at the lip without requiring lubricant to go through, for example, holes or passageways to lubricate the sealing lip. It is a still further object of the present invention to provide a semi-unitized shaft seal that does not have metal parts that can interfere with each other during rotation.

It is another object of this invention to provide a semi-unitized shaft seal: that has fewer metal parts, that allows the area directly over where the sealing lip contacts the wear sleeve to be continually flooded with oil to dissipate heat, and that has no area where dirt and water can become lodged or trapped.

SUMMARY OF THE INVENTION

A two-part, separable, semi-unitized hub-type shaft seal for sealing between a housing bore and a relatively rotatable shaft and including a metal wear sleeve member including a cylindrical wear sleeve flange and a radial flange, with the cylindrical flange adapted to press-fit onto one of a shaft and a bore, and a sealing member assembled onto the wear sleeve member. The sealing member includes a metal reinforcing ring, a sealing element connected to the reinforcing ring and having an annular sealing lip forced by a resilient biasing means such as a garter spring into sealing contact with the wear surface of the cylindrical flange of the wear sleeve member, an elastomeric layer bonded to the reinforcing ring and adapted to provide an interference fit in the other of the bore and shaft, and at least one annular elastomeric bumper ring bonded to the reinforcing ring and extending axially into contact with a radial face of a radial flange of the wear sleeve member.

This seal can be assembled, transported and installed as a unitized seal, however, it can be disassembled for inspection and replacement of either or both parts. Upon removal of the housing from the shaft, one seal part stays with the housing while the other part stays with the shaft, whereby the seal of the present invention does not resist removal of the housing from the shaft. The term "semi-unitized" is hereby defined for use in the present specification and claims with respect to a two-part separable shaft seal including a wear sleeve and an elastomeric member having a sealing element with a sealing lip in sealing contact with a wear surface of the wear sleeve, as meaning such a seal that is not permanently, structurally unitized but rather such a shaft seal which, when assembled together, will remain assembled for transportation, shipping, and installation but which can be disassembled by axially pulling the two members apart.

BRIEF DESCRIPTION OF THE DRAWINGS

The present invention will be more fully understood by reference to the following detailed description thereof, when read in conjunction with the attached drawings, wherein like reference numerals refer to like elements and wherein.

DETAILED DESCRIPTION OF THE PREFERRED EMBODIMENTS

Figure 1:
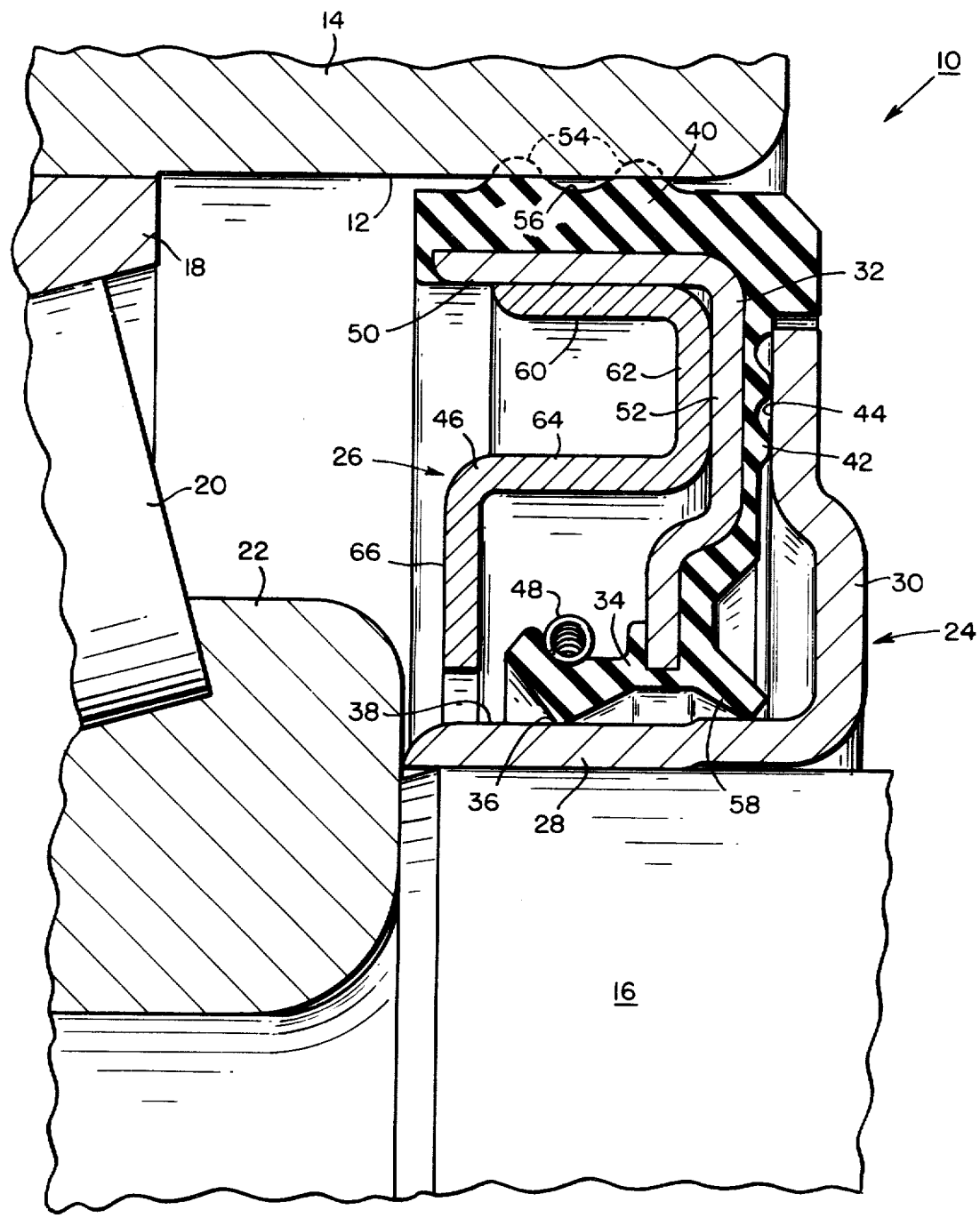
FIG. 1 is an enlarged, fragmentary, partly cross-sectional view of a seal according to one embodiment of the present invention.

With reference now to the drawings, FIG. 1 shows one preferred embodiment of the present invention including a semi-unitized shaft seal 10 for sealing between a bore 12 of a housing 14 and a shaft 16. In a particular application the housing 14 is a truck sheel hub and the shaft 16 is a truck axle or spindle. Also located between the housing 14 and shaft 16 is a bearing assembly including a bearing cup 18, bearing rollers 20 and a bearing cone 22.

The seal 10 comprises a metal wear sleeve member 24 and a sealing member 26 assembled together to form the two-part, separable, semi-unitized seal 10. The wear sleeve member 24 includes a cylindrical flange 28 and a radial flange (or deflector ring) 30. The I.D. of the cylindrical flange 28 is designed to provide a press-fit on the shaft 16. The radial flange 30 extends radially outwardly from the axially outer end of the cylindrical flange 28. The axially outer direction being the direction to the right as shown in FIG. 1; the term "outer" is with reference to the volume being sealed. The wheel hub or housing 14 is removed from the shaft 16 by pulling the housing off of the shaft to the left as viewed in FIG. 1.

The sealing member 26 includes a metal reinforcing ring 32, an elastomeric sealing element 34, an elastomeric O.D. 40 and an elastomeric bumper member 42. The elastomeric O.D. is bonded to the reinforcing ring 32 and has an annular sealing lip 36 in sealing contact with the O.D. wear surface 38 of the cylindrical flange 28 of the wear sleeve member 24. The elastomeric O.D. 40 is designed to provide an interference fit in the bore 12. The bumper member 42 includes at least one annular ring (two or more such rings are preferred and two are shown in FIG. 1) bonded to the reinforcing ring 32 and extending axially into contact with the inner radial face 44 of the radial flange 30 of the wear sleeve member 24. Thus, the sealing member 26 is properly located axially with respect to the wear sleeve member 24. The sealing member 26 also includes an inner metal ring 46 connected (as by press fitting) to the reinforcing ring 32. A garter spring 48 is preferably employed for urging the sealing lip 36 into contact with the wear surface 38 in a manner well-known to those skilled in the art. The elastomer of the sealing element 34, the elastomeric O.D. 40, and the bumper ring 42 is preferably one integral piece molded at the same time onto the reinforcing ring 32.

The reinforcing ring 32 includes a cylindrical flange 50 and a radial flange 52 extending radially inwardly from the axially outer end of the cylindrical flange 50. The elastomeric O.D. 40 is bonded to the O.D. of the cylindrical flange 50 and is adapted to provide an interference fit in the bore 12. The surface of the elastomeric O.D. 40 is preferably provided with a plurality of circumferential, axially spaced-apart ridges 54 (the ridges 54 are also shown in FIG. 1 in their uncompressed state by dotted lines) with a valley 56 therebetween to accommodate the material of the ridges when the ridges are compressed during installation. Preferably these ridges are designed so as to be compressed more than 50% of their height when installed. The elastomeric sealing element 34 includes, in addition to the sealing lip 36, a dust lip 58 on the opposite side of the radial flange 52 from the sealing lip 36.

The inner ring 46 is connected, as by press fitting, to the reinforcing ring 32 on the opposite side thereof from the radial flange 30 of the wear sleeve member 24. The inner ring 46 includes a first cylindrical portion 60, a first radial portion 62 extending radially inwardly from the axially outer end of the first cylindrical portion, a second cylindrical portion 64 extending axially inwardly from the radially inner end of the first radial portion 62, and a second radial portion 66 extending radially inwardly from the axially inner end of the second cylindrical portion 64. The second radial portion 66 of the inner ring 46 is a protective flange spaced axially inwardly from the sealing lip 36 for protecting the sealing lip from damage and also to aid in retention of the garter spring 48.

In installing the seal of the present invention, the seal is installed as a unitary seal by a single tool. The metal wear sleeve forming the press-fit is provided on either the I.D. or the O.D. of the seal, depending on whether or not the seal is to be installed first on the shaft or in the bore. The other sealing joint provided by the elastomeric interference fit is provided on the other of the I.D. or O.D. of the seal. In the embodiment shown in FIG. 1, the I.D. of the seal is a press fit and the O.D. is the elastomeric interference fit. The seal 10 is installed onto the shaft 16 using a single tool with the seal 10 being treated as a unitary or unitized seal. The wheel hub or housing 14 is then installed on the shaft 16 with the bore 12 sliding onto the elastomeric O.D. 40 and forming an interference fit therewith. When the housing or hub 14 is removed from the shaft 16, the sealing member 26 stays with the hub while the wear sleeve member 24 stays with the shaft. Thus, the seal 10 is automatically disassembled. The sealing member 26 can then be inspected for wear and damage and can be replaced, if necessary, without affecting the wear sleeve member 24. Similarly, the wear sleeve 24 can be inspected and can be replaced, if necessary, without replacing the sealing member 26. The two parts of the seal 10 can thus be inspected and replaced, if necessary, without discarding the entire seal.

Figure 2:
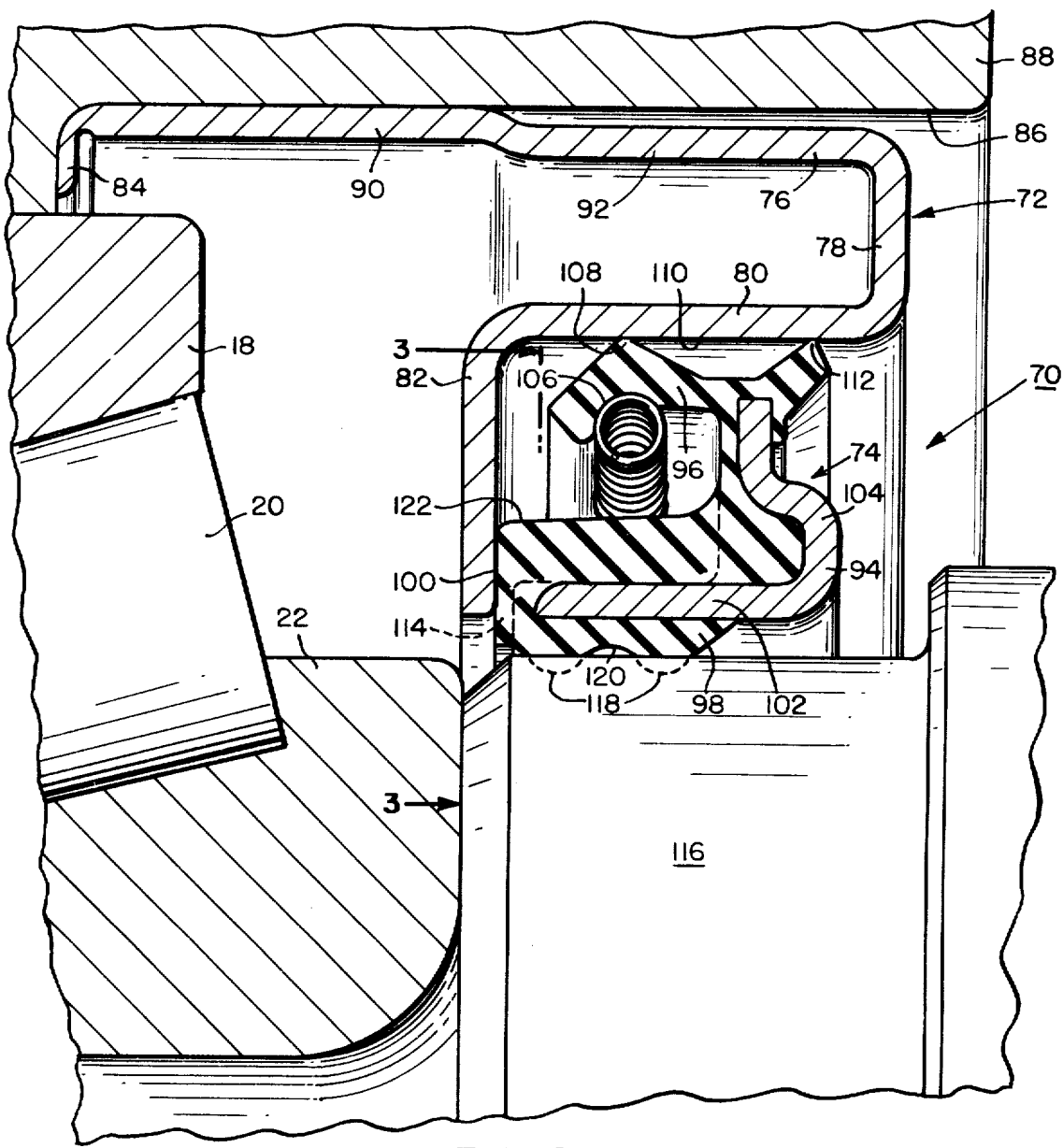
FIG. 2 is an enlarged, fragmentary, partly cross-sectional, view of a seal according to another embodiment of the present invention.
Figure 3:
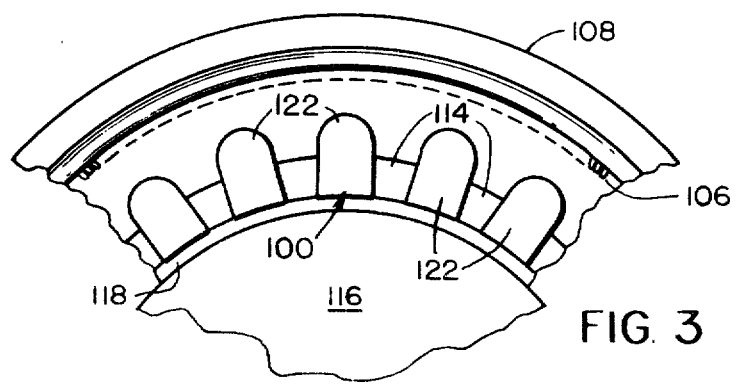
FIG. 3 is a partial elevational view taken along the lines 3—3 in FIG. 2.

FIGS. 2 and 3 show another embodiment of the present invention comprising a seal 70 including a wear sleeve member 72 and a sealing member 74. The wear sleeve member 72 includes a first cylindrical flange 76, a first radial flange 78 extending radially inwardly from the axially outer end of the first cylindrical flange 76, a second cylindrical flange 80 extending axially inwardly from the radially inner end of the first radial flange 78, and a second radial flange 82 extending radially inwardly from the axially inner end of the second cylindrical flange 80. The wear sleeve member 72 includes an abutting flange 84 extending radially inwardly from the axially inner end of the first cylindrical flange 76 for properly positioning the wear sleeve member 72 in a bore 86 of a housing 88 (such as a truck wheel hub). The first cylindrical flange 76 includes a radially outer stepped portion 90 and a radially inner stepped portion 92.

The sealing member 74 includes a reinforcing ring 94, an elastomeric sealing element 96, an elastomeric I.D. 98 and an annular elastomeric bumper member 100. The reinforcing ring 94 includes a cylindrical flange 102 and a radial flange 104 extending radially outwardly from the axially outer end of the cyldindrical flange 102. The sealing element 96, the elastomeric I.D. 98 and the elastomeric bumper member 100 are all one integral body of elastomeric material bonded onto the reinforcing ring 94 all at the same time. A garter spring 106 is used for forcing or urging a sealing lip 108 of the sealing element 96 into contact with a wear surface 110 of the wear sleeve member 72. The wear surface 110 is the I.D. surface of the second cylindrical flange 80. The sealing element 96 also includes a dust lip 112 in contact with the wear surface 110. The bumper member 100 includes a plurality of radial lubricant passageways 114 (also shown in FIG. 3) extending therethrough to provide lubrication to the sealing lip 108. The distal or radially inner end of the second radial flange 82 is spaced-apart from a shaft 116 to provide a lubricating passage therebetween. The bumper member 100 contacts the radial flange 82 and thus properly axially locates the sealing member 74 with respect to the wear sleeve member 72. The elastomeric I.D. 98 is preferably formed as a plurality of circumferential, spaced-apart ridges 118 (the ridges 118 are also shown in FIG. 2 in their uncompressed state by dotted lines). The rubber in the ridges is displaced into adjacent valleys, such as a valley 120, on either side of the ridges 118 when the ridges are compressed. Preferably the ridges are designed to be compressed more than 50% of their height when installed on a shaft.

Circulation of sealed fluid around the O.D. surface of cylindrical flange 80 also helps to carry away heat generated at wear surface 110.

FIG. 3 is a view looking at the sealing member 74 from the left as viewed in FIG. 2 (with the second radial flange 82 of the wear sleeve member 72 removed), and shows more clearly the lubricating passageways 114 through the bumper member 100. The bumper member 100 includes a plurality of identical, equally spaced-apart, axially extending ridges 122 between which are located the passageways 114. The particular design of the passageways 114 and ridges 122 of FIGS. 2 and 3 is not critical; other designs can be used.

Providing the passageways 114 also serves to reduce the contact area between the bumper member 100 and the flange 82 and thus, also reduces the rotary friction therebetween.

Figure 4:
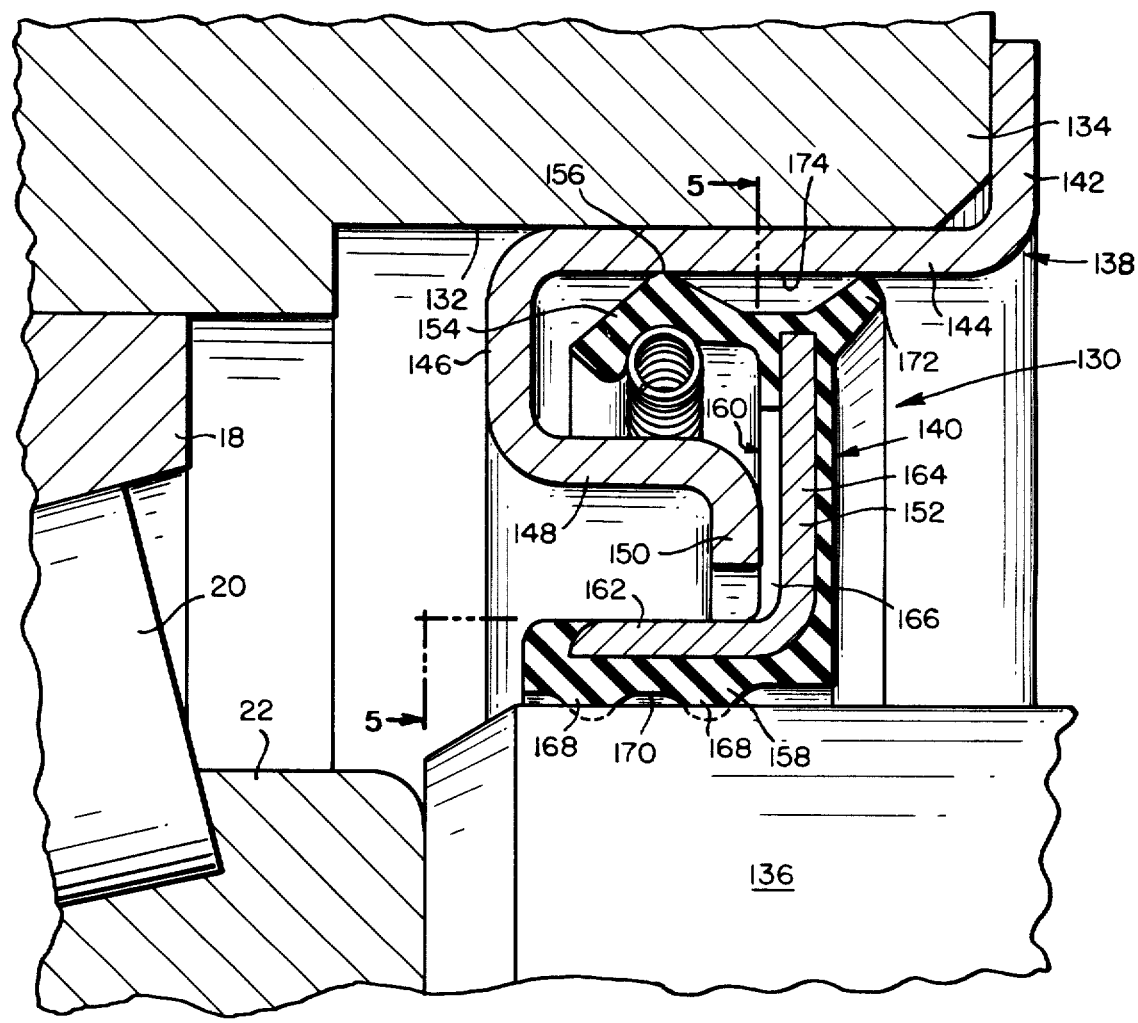
FIG. 4 is an enlarged, fragmentary, partly cross-sectional view of a seal according to another embodiment of the present invention.
Figure 5:
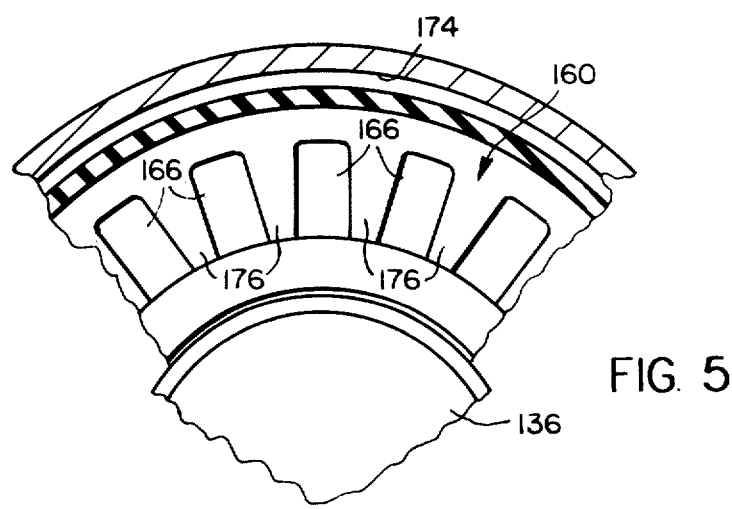
FIG. 5 is a partial elevational view taken along the lines 5—5 in FIG. 4.

FIGS. 4 and 5 show another hub shaft seal according to the present invention comprising a seal 130 for sealing the space between a bore 132 of a housing 134 and a shaft 136. The seal 130 includes a wear sleeve member 138 and a sealing member 140. The wear sleeve member 138 includes a first radial flange 142, a first cylindrical flange 144 extending axially inwardly from the radially inner end of the first radial flange 142, a second radial flange 146 extending radially inwardly from the axially inner end of the first cylindrical flange 144, a second cylindrical flange 148 extending axially outwardly from the radially inner end of the second radial flange 146, and a third radial flange 150 extending radially inwardly from the axially outer end of the second cylindrical flange 148. The first radial flange 142 is an abutting flange designed to abut a radial surface of the wheel hub or housing 134 to locate the seal 130 properly axially in the application. The O.D. of the first cylindrical flange 144 is designed to press-fit in the bore 132. The third radial flange 150 is designed to contact the sealing member 140 to position the sealing member 140 properly axially in the application.

The sealing member 140 comprises a reinforcing ring 152, an elastomeric sealing element 154 having a sealing lip 156, an elastomeric I.D. 158 and an elastomeric bumper member 160. The reinforcing ring 152 includes a cylindrical flange 162 and a radial flange 164 extending radially outwardly from the axially outer end of the cylindrical flange 162. It is noted that the bumper member 160 is contacted by the third radial flange 150. Lubricating passageways 166 are provided through the bumper member 160 (as is also shown in FIG. 5). The elastomeric I.D. 158 preferably includes a plurality of circumferential, axially spaced-apart ridges 168 (the ridges 168 are also shown in FIG. 4 in their uncompressed state by dotted lines) with valleys 170 therebetween, into which the material of the ridges is displaced when the ridges are compressed. Preferably the ridges are designed so as to be compressed more than 50% of their height (as measured from the bottom of the valley to the top of the ridges in their uncompressed state). The sealing element 154 also includes a dust lip 172 extending into contact with the wear surface 174.

FIG. 5 is a view looking at the bumper member 160 from the left as viewed in FIG. 4 (with the wear sleeve member 138 removed) and more clearly shows the lubricating passageways 166 through the bumper member. The bumper member 160 includes a plurality of identical, equally spaced-apart, radially extending ridges 176 between which are located the passageways 166. The particular design of the passageways 166 and ridges 176 shown in FIGS. 4 and 5 is not critical; other designs can be used.

In the seals shown in FIGS. 2-5, the wear sleeve members 72 and 138, respectively, are designed for use in truck wheel hubs where the seal assembly is driven into the bore of the wheel hub (the housings 88 and 134, respectively,) and then this wheel with the seal installed is assembled over the axle or spindle (the shafts 116 and 136, respectively, in FIG. 2 and 4). One reason for this design is that a bearing cone 18 can be retained in the wheel hub 88 and 134, respectively, by the seal 70 and 130, respectively, and then the bearing I.D. acts as a guide when the wheel is docked onto the spindle or shaft. As with the other embodiments of the present invention, the seals 70 and 130 are really two separate pieces but they can be handled and installed as a unitized assembly and require only one installation tool.

Figure 6:
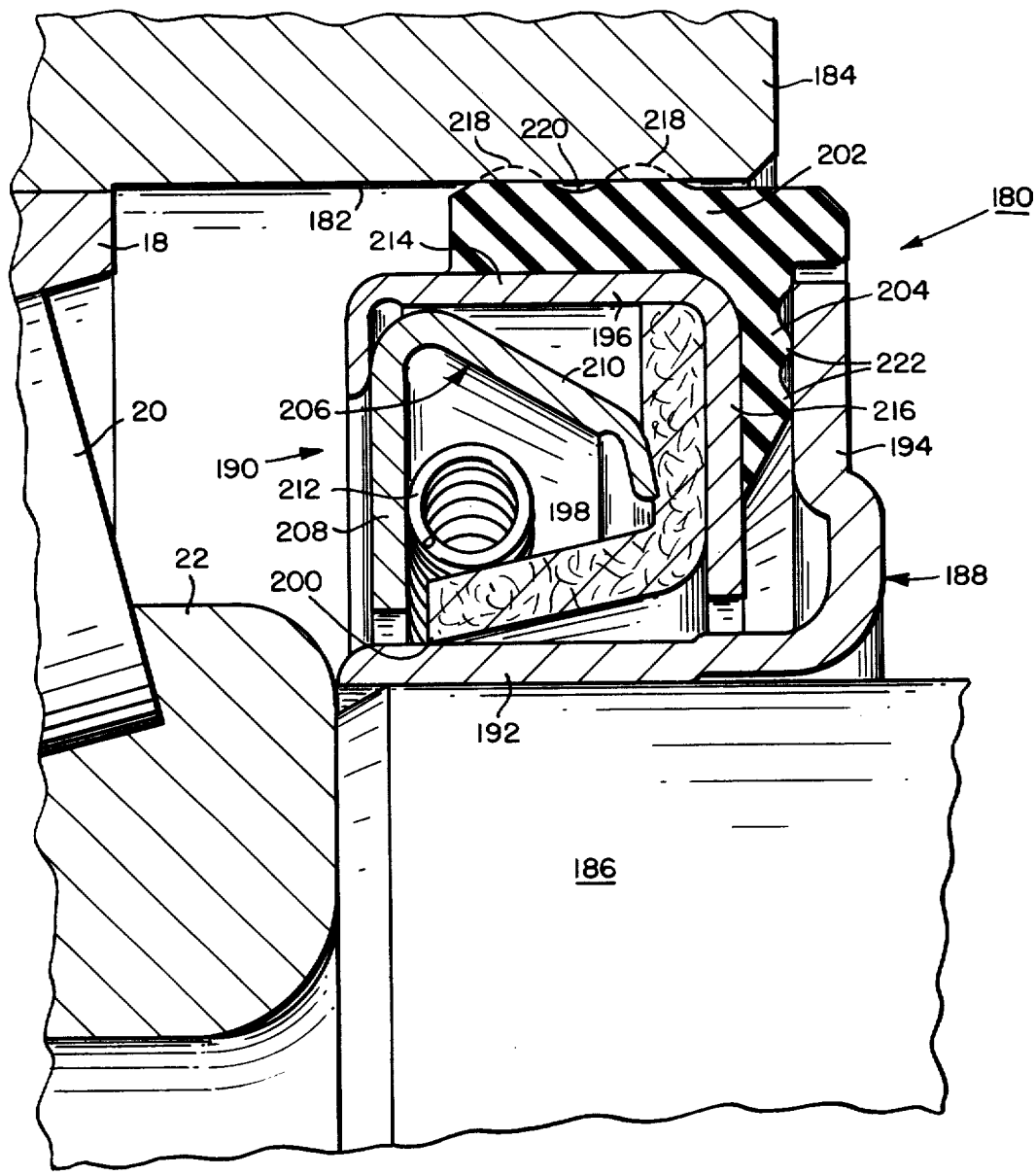
FIG. 6 is an enlarged, fragmentary, partly cross-sectional view of a seal according to a still further embodiment of the present invention.

FIG. 6 shows another embodiment of the present invention comprising a seal 180 for use between a bore 182 of a wheel hub or other housing 184 and a shaft 186. The seal 180 includes a wear sleeve member 188 and a sealing member 190. The wear sleeve member 188 includes a cylindrical flange 192 and a radial flange 194 extending radially outwardly from the axially outer end of the cylindrical flange 192. The I.D. of the cylindrical flange 192 is designed to form a press-fit onto the shaft 186.

The sealing member 190 includes a reinforcing ring 196, a sealing element 198 having a sealing lip 200, an elastomeric O.D. 202 for providing an interference fit in the bore 182, and an elastomeric bumper ring 204, extending axially outwardly into contact with an inner radial face of the radial flange 194 of the wear sleeve member 188. The sealing member 190 also includes an inner ring 206 including a radial flange 208 and a radially inwardly and axially outwardly tapering flange 210. The distal end of the tapered flange 210 extends into holding contact with the sealing element 198 while the distal end of the radial flange 208 is positioned to retain a garter spring 212 in place behind the sealing lip 200 and is also a protective flange for the sealing element 198. The reinforcing ring includes a cylindrical flange 214 and a radial flange 216 extending radially inwardly from the axially outer end of the cylindrical flange 214. The axially inner end of the clyindrical flange 214 is rolled or bent over against the inner ring 206 to lock it in place therefore also locking the sealing element 198 in place. The elastomeric O.D. 202 and the elastomeric bumper ring 204 are preferably one integral body of elastomeric material bonded onto the reinforcing ring 196. The elastomeric O.D. preferably includes a plurality of circumferential, axially spaced-apart ridges 218 (the ridges 218 are also shown in FIG. 6 in their uncompressed state by dotted lines) with a valley 220 between each pair of ridges. The material of the ridges is forced into the valleys during compression thereof. The ridges are preferably designed so as to be compressed more than 50% of their height when installed. The bumper member 204 preferably includes a plurality of concentric, radially spaced-apart bumper rings 222.

It is to be noted that the phrase "shaft seal for providing a seal between a housing bore and a relatively rotatable shaft extending through the bore" means that there is relative rotation between the housing and shaft, for example, either one of the housing and shaft can be stationary and the other one will then be rotatable.

The invention has been described in detail with particular reference to the preferred embodiments thereof, but it will be understood that variations and modifications can be effected within the spirit and scope of the invention as described hereinabove and as defined in the appended claims.

I claim:

1. A two-part, separable, semi-unitized shaft seal for providing a seal between a housing bore and a relatively rotatable shaft extending through the bore comprising:
   (a) a wear sleeve member including at least one cylindrical flange and at least one radial flange, one of said at least one cylindrical flanges having a press-fit surface for forming a press-fit with one of a bore and shaft, and one of said at least one cylindrical flanges having a wear surface for the below-recited sealing lip, and
   (b) a sealing member movable axially onto and off of said wear sleeve member and assembled in semi-unitized relationship relative to said wear sleeve member including a reinforcing ring having a cylindrical flange and a radial flange, a sealing element connected to said radial flange of said reinforcing ring and having an annular sealing lip in sealing contact with said wear surface, a layer of elastomer bonded to one of an I.D. or O.D. surface of said cylindrical flange of said reinforcing ring for forming an interference fit on the other of a bore and shaft, and an elastomeric bumper member bonded to said reinforcing ring and extending axially into contact with a radial face of one of said radial flanges of said wear sleeve member whereby said wear sleeve member and said sealing member can be assembled together for transportation, shipping, and installation as a unitized seal, and
   (c) said sealing member being movable axially, with respect to said wear sleeve member, away from and out of contact with said wear sleeve member with said sealing lip being slidable axially off of said wear surface for disassembling said two part, separable, semi-unitized shaft seal wherein upon disassembly of a bore and shaft between which said seal is located, said wear sleeve member and said sealing member also become disassembled, one of said members staying with one of the bore and shaft and the other of said members staying with the other of said bore and shaft.

2. The seal according to claim 1 wherein said bumper member comprises at least one bumper ring and including radially extending lubricant passageways extending through said at least one elastomeric bumper ring.

3. The seal according to claim 1 wherein said sealing lip is located axially between a radial flange of said wear sleeve member and a radial flange of said reinforcing element on the same side of said wear surface as is said sealing lip and wherein said bumper member comprises at least one annular bumper ring and includes radially extending lubricant passageways extending through said at least one elastomeric bumper ring for providing lubrication for said sealing lip.

4. The seal according to claim 1 wherein said radial flange of said reinforcing ring is located in-between, in an axial direction, said sealing lip and a radial flange of said wear sleeve member.

5. The seal according to claim 1 wherein said wear surface has one axial end thereof free of any radial flanges on the sealing lip side thereof.

6. The seal according to claim 5 wherein said interference fit surface of said layer of elastomer includes a plurality of circumferential spaced-apart ridges and wherein said ridges are adapted to be compressed more than 50% in height to provide said interference fit.

7. The seal according to claim 1 including resilient biasing means for urging said sealing lip toward said wear surface.

8. The seal according to claim 1 wherein said sealing element is elastomeric and is integral with said layer of elastomer and said bumper member.

9. The seal according to claim 8 wherein said sealing element includes a dust lip in sealing engagement with said wear surface and on the other side of said radial flange of said reinforcing ring from that of said sealing lip.

10. A method for providing a seal comprising the steps of:
   (a) providing a two-part, separable, semi-unitized shaft seal including a wear sleeve member including a radial flange and a cylindrical flange for providing a pressfit onto one of a bore and shaft, and a sealing member movable axially onto and off of said wear sleeve member, said sealing member including a reinforcing ring and a sealing element having a sealing lip connected thereto and resilient means urging said lip into sealing contact with a wear surface of said wear sleeve member, said sealing member also having an annular elastomeric bumper member bonded to said reinforcing ring and extending into contact with a radial flange of said wear sleeve member and said sealing member also having a layer of elastomer bonded to said reinforcing ring for providing an interference fit on the other of a bore and shaft, said sealing member being movable axially, with respect to said wear sleeve member, away from and out of contact with said wear sleeve member with said sealing lip being slidable axially off of said wear surface for disassembling said two part, separable, semi-unitized shaft seal, and
   (b) assembling said sealing member and said wear sleeve member together as a semi-unitized seal for transportation, shipping and installation by sliding said sealing lip in an axial direction onto a wear surface of said wear sleeve member.

11. The method according to claim 10 including installing said assembled seal between a housing bore and a relatively rotatable shaft extending through said bore, as a unitized seal with a single tool.

12. The method according to claim 11 including axially separating said housing and shaft to axially separate said wear sleeve member and said sealing member whereby one of said members remains attached to one of said housing and shaft and the other of said members remains attached to the other of said housing and shaft.

13. The method according to claim 12 including inspecting said wear sleeve member for wear and damage visually without removing said wear sleeve member from engagement with one of said housing and shaft.

14. The method according to claim 12 including inspecting said sealing member without removing it from engagement with one of said housing and shaft.

15. The method according to claim 10 including axially separating said wear sleeve member and said sealing member for inspection thereof.

16. A two-part, separable, semi-unitized shaft seal for providing a seal between a housing bore and a relatively rotatable shaft extending through the bore comprising:
 (a) a shaft wear sleeve member including a cylindrical flange and a radial flange, said cylindrical flange having an I.D. adapted to press-fit onto a shaft and said radial flange extending radially outwardly from the axially outer end of said cylindrical flange, and
 (b) a sealing member movable axially onto and off of said wear sleeve member and assembled onto said wear sleeve member and including a reinforcing ring, an elastomeric sealing element bonded to said reinforcing ring and having an annular sealing lip in sealing contact with the O.D. wear surface of said cylindrical flange of said wear sleeve member, a layer of elastomer bonded to said reinforcing ring and adapted to provide an elastomeric O.D. interference fit in a bore, and at least one annular elastomeric bumper ring bonded to said reinforcing ring and extending axially outwardly into contact with an inner radial face of said radial flange of said wear sleeve member, and
 (c) said sealing member being movable axially, with respect to said wear sleeve member, away from and out of contact with said wear sleeve member with said sealing lip being slidable axially off of said wear surface for disassembling said two part, separable, semi-unitized shaft seal.

17. The seal according to claim 16 wherein said layer of elastomer includes a plurality of circumferential, spaced-apart ridges.

18. The seal according to claim 17 wherein said ridges are adapted to be compressed more than 50% in height when installed in a bore.

19. The seal according to claim 16 including an inner annular ring connected to said reinforcing ring on the opposite side thereof from said radial flange of said wear sleeve member, said inner ring including a radial protective flange spaced axially inwardly from said sealing lip for protecting said sealing lip from damage.

20. The seal according to claim 19 including a garter spring on said sealing element behind said lip for urging said sealing lip toward O.D. surface of said cylindrical flange of said wear sleeve member and wherein said protective flange is positioned for retaining said garter spring in place.

21. A two-part, separable, semi-unitized shaft seal for providing a seal between a housing bore and a relatively rotatable shaft extending through the bore comprising:
 (a) a shaft wear sleeve member including a cylindrical flange and a radial flange, said cylindrical flange having an I.D. adapted to press-fit onto a shaft and said radial flange extending radially outwardly from the axially outer end of said cylindrical flange, and
 (b) a sealing member assembled onto said wear sleeve member and including a reinforcing ring, an elastomeric sealing element bonded to said reinforcing ring and having an annular sealing lip in sealing contact with the O.D. wear surface of said cylindrical flange of said wear sleeve member, a layer of elastomer bonded to said reinforcing ring and adapted to provide an elastomeric O.D. interference fit in a bore, at least one annular elastomeric bumper ring bonded to said reinforcing ring and extending axially outwardly into contact with an inner radial face of said radial flange of said wear sleeve member, an inner annular ring connected to said reinforcing ring on the opposite side thereof from said radial flange of said wear sleeve member, said inner ring including a radial protective flange spaced axially inwardly from said sealing lip for protecting said sealing lip from damage, a garter spring on said sealing element behind said lip for urging said sealing lip toward said O.D. surface of said cylindrical flange of said wear sleeve member and wherein said protective flange is positioned for retaining said garter spring in place, and wherein said inner ring has a first cylindrical flange connected to the I.D. of said cylindrical flange of said reinforcing ring and a first radial flange extending radially inwardly from the axially outer end of said first cylindrical flange of said inner ring and abutting the radially inner face of said first radial flange of said reinforcing ring, a second cylindrical flange extending axially inwardly from the radially inner end of said first radial flange and a second radial flange extending radially inwardly from the axially inner end of said second cylindrical flange, said second radial flange being said protective flange.

22. The seal according to claim 16 wherein said elastomeric sealing element also includes a dust lip spaced axially from said sealing lip and in contact with said O.D. surface of said cylindrical flange of said wear sleeve member and located between said sealing lip and said radial flange of said wear sleeve member.

23. The seal according to claim 16 wherein said at least one bumper ring comprises a plurality of concentric, radially spaced-apart rings.

24. The seal according to claim 16 wherein said reinforcing ring includes a cylindrical flange and a radial flange, said layer of elastomer being bonded to the O.D. of said cylindrical flange of said reinforcing ring, said radial flange of said reinforcing ring extending radially inwardly from the axially outer end of said cylindrical flange of said reinforcing ring, and said bumper ring being bonded to the axially outer surface of said radial flange of said reinforcing ring and extending into contact with the inner radial face of said radial flange of said wear sleeve member.

25. The seal according to claim 24 wherein said radial flange of said reinforcing ring has an I.D. spaced away from the O.D. wear surface of said wear sleeve member and wherein said sealing lip is located axially inwardly from said I.D. of said radial flange of said reinforcing ring and is connected thereto by a flexible, axially extending cylindrical elastomeric portion, and wherein said elastomeric sealing element also includes an elastomeric dust lip in contact with said O.D. wear surface, said dust lip extending axially outwardly from said I.D. of said cylindrical flange of said reinforcing ring.

26. The seal according to claim 24 including an inner annular ring connected to said reinforcing ring on the opposite side thereof from said radial flange of said wear sleeve member, said inner ring including a radial protective flange spaced axially inwardly from said sealing lip for protecting said sealing lip from damage.

27. The seal according to claim 26 including a garter spring on said sealing element behind said lip for urging said sealing lip toward said O.D. surface of said cylindrical flange of said wear sleeve member and wherein said protective flange is positioned for retaining said garter spring in place.

28. The seal according to claim 27 wherein said inner ring has a first cylindrical flange connected to the I.D. of said cylindrical flange of said reinforcing ring and a first radial flange extending radially inwardly from the axially outer end of said first cylindrical flange of said inner ring and abutting the radially inner face of said first radial flange of said reinforcing ring, a second cylindrical flange extending axially inwardly from the radially inner end of said first radial flange and a second radial flange extending radially inwardly from the axially inner end of said second cylindrical flange, said second radial flange being said protective flange.

29. The seal according to claim 28 wherein said elastomeric sealing element also includes a dust lip spaced axially from said sealing lip and in contact with said O.D. surface of said cylindrical flange of said wear sleeve member and located between said sealing lip and said radial flange of said wear sleeve member.

30. The seal according to claim 29 wherein said at least one bumper ring comprises two concentric, radially spaced-apart rings.

31. A two-part, separable, semi-unitized shaft seal for providing a seal between a housing bore and a relatively rotatable shaft extending through the bore comprising:
(a) a wear sleeve member including at least one radial flange, one cylindrical flange having an O.D. adapted to press fit into a bore and a radial flange extending radially inwardly from said cylindrical flange, and
(b) a sealing member movable axially onto and off of said wear sleeve member and assembled onto said wear sleeve member in semi-unitized relationship relative thereto and including a reinforcing ring, an elastomeric sealing element bonded to said reinforcing ring and having an annular sealing lip in sealing contact with an I.D. wear surface of a cylindrical flange of said wear sleeve member, a layer of elastomer bonded to said reinforcing ring and adapted to provide an elastomeric I.D. interference fit on a shaft, and at least on annular elastomeric bumper member bonded to said reinforcing ring and extending axially into contact with an outer radial face of a radial flange of said wear sleeve member, and said sealing member being movable axially, with respect to said wear sleeve member, away from and out of contact with said wear sleeve member with said sealing lip being slidable axially off of said wear surface for disassembling said two part, separable, semi-unitized shaft seal.

32. The seal according to claim 31 wherein said layer of elastomer includes a plurality of circumferential, spaced-apart ridges with a valley between each pair of ridges.

33. The seal according to claim 32 wherein said ridges are adapted to be compressed more than 50% in height when installed on a shaft.

34. The seal according to claim 31 wherein said bumper member includes lubricant passageways extending radially through said bumper member.

35. A two-part, semi-unitized shaft seal for providing a seal between a housing bore and a relatively rotatable shaft extending through the bore comprising:
(a) a wear sleeve member including at least one cylindrical flange and at least one radial flange, one cylindrical flange having an O.D. adapted to press fit into a bore and a radial flange extending radially inwardly from said cylindrical flange, and wherein said wear sleeve member includes a first cylindrical flange having an O.D. adapted to press-fit into a bore, a first radial flange extending radially inwardly from the axially outer end of said first cylindrical flange, a second cylindrical flange extending axially inwardly from the radially inner end of said first radial flange and a second radial flange extending radially inwardly from the axially inner end of said second cylindrical flange, and
(b) a sealing member assembled onto said wear sleeve member and including a reinforcing ring, an elastomeric sealing element bonded to said reinforcing ring and having an annular sealing lip in sealing contact with an I.D. wear surface of a cylindrical flange of said wear sleeve member, a layer of elastomer bonded to said reinforcing ring and adapted to provide an elastomeric I.D. interference fit on a shaft, and at least one annular elastomeric bumper member bonded to said reinforcing ring and extending axially into contact with an outer radial face of a radial flange of said wear sleeve member.

36. The seal according to claim 35 wherein the I.D. surface of said second cylindrical flange is the wear surface for said sealing lip and wherein said sealing member includes a resilient means forcing said sealing lip into contact with said wear surface.

37. The seal according to claim 35 wherein said bumper member extends into contact with the axially outer surface of said second radial flange.

38. The seal according to claim 37 wherein said bumper member includes lubricant passageways extending radially through said bumper member.

39. The seal according to claim 38 wherein the radially inner distal end of said second radial flange is spaced-apart from said shaft to provide a lubricant passageway therebetween.

40. The seal according to claim 35 wherein said reinforcing ring includes a cylindrical flange and a radial flange extending radially outwardly from the axially outer end of said cylindrical flange and wherein said layer of elastomer is bonded to the I.D. of said cylindrical flange to provide said elastomeric I.D. interference fit and wherein said bumper member extends axially inwardly from the axially inner end of said cylindrical flange and into contact with the axially outer surface of said second radial flange of said wear sleeve member.

41. The seal according to claim 35 wherein said sealing member is located axially outwardly of said second radial flange and radially inwardly of said second cylindrical flange.

42. The seal according to claim 35 including an abutting flange extending radially inwardly from the axially inner end of said first cylindrical flange for properly locating said seal.

43. The seal according to claim 35 wherein said first cylindrical flange includes a first cylindrical portion located radially outwardly from an inwardly stepped second cylindrical portion.

44. The seal according to claim 35 wherein said layer of elastomer, said elastomeric bumper member and said elastomeric sealing element are all one integral body of elastomer molded onto said reinforcing ring.

45. The seal according to claim 44 wherein said elastomeric sealing element also includes a dust lip extending from said reinforcing ring radially outwardly into contact with said wear surface.

46. The seal according to claim 45 wherein the I.D. surface of said second cylindrical flange is the wear surface of said sealing lip and including a resilient means forcing said sealing lip into contact with said wear surface.

47. The seal according to claim 46 wherein said bumper member extends into contact with the axially outer surface of said second radial flange.

48. The seal according to claim 47 wherein said bumper member includes lubricant passageways extending radially through said bumper member.

49. The seal according to claim 48 wherein the radially inner distal end of said second radial flange is spaced-apart from said shaft to provide a lubricant passageway therebetween.

50. The seal according to claim 49 wherein said reinforcing ring includes a cylindrical flange and a radial flange extending radially outwardly from the axially outer end of said cylindrical flange and wherein said layer of elastomer is bonded to the I.D. of said cylindrical flange to provide said elastomeric I.D. interference fit.

51. The seal according to claim 50 wherein said sealing member is located axially outwardly of said second radial flange and radially inwardly of said second cylindrical flange.

52. The seal according to claim 51 including an abutting flange extending radially inwardly from the axially inner end of said first cylindrical flange.

53. The seal according to claim 52 wherein said first cylindrical flange includes a first cylindrical portion located radially outwardly from an inwardly stepped second cylindrical portion.

54. The seal according to claim 53 wherein said layer of elastomer includes a plurality of circumferential, spaced-apart ridges with a valley between each pair of ridges.

55. The seal according to claim 54 wherein said ridges are adapted to be compressed more than 50% in height when installed on a shaft.

56. A seal according to claim 31 wherein said wear sleeve member includes a first radial portion, a first cylindrical portion extending axially inwardly from a radially inner end of said first radial portion, a second radial portion extending radially inwardly from the axially inner end of said first cylindrical portion, a second cylindrical portion extending axially outwardly from the radially inner end of said second radial flange and a third radial flange extending radially inwardly from the axial outer end of said second cylindrical flange and wherein the I.D. of said first cylindrical flange comprises a wear surface and wherein said sealing lip is in sealing contact with said wear surface.

57. The seal according to claim 56 wherein said first radial flange is an abutting flange adapted to contact a radial surface of said housing for properly locating said seal.

58. The seal according to claim 56 wherein said reinforcing ring includes a cylindrical flange and a radial flange extending radially outwardly from the axially outer end of said cylindrical flange and wherein said bumper member is located on the inner radial surface of said radial flange of said reinforcing ring and wherein said third radial flange of said wear sleeve is in contact with said bumper member.

59. The seal according to claim 58 wherein said bumper member includes lubricant passageways extending radially through said bumper member.

60. The seal according to claim 56 wherein said layer of elastomer includes a plurality of circumferential spaced-apart ridges with a valley between each pair of ridges.

61. The seal according to claim 60 wherein said ridges are adapted to be compressed more than 50% in height when installed on a shaft.

62. The seal according to claim 56 including a garter spring for urging said sealing lip radially outwardly into contact with said wear surface and wherein said sealing element is positioned axially inwardly of said radial flange of said reinforcing ring and axially outwardly from said second radial flange and wherein said sealing element is also located between said wear surface and said second cylindrical flange.

63. The seal according to claim 62 wherein said sealing element also includes a dust lip in contact with said wear surface and located on the opposite side of said radial flange of said reinforcing ring from said sealing lip.

64. A two-part, separable, semi-unitized shaft seal for providing a seal between a housing bore and a relatively rotatable shaft extending through the bore comprising:
(a) a wear sleeve member including a cylindrical flange and a radial flange, said cylindrical flange having an I.D. adapted to press fit onto a shaft and said radial flange extending radially outwardly from the axially outer end of said cylindrical flange, and
(b) a sealing member movable axially onto and off of said wear sleeve member and assembled onto said wear sleeve member in semi-unitized relationship relative thereto and including a reinforcing ring, a sealing element connected to said reinforcing ring and having an annular sealing lip in sealing contact with the O.D. wear surface of said cylindrical flange of said wear sleeve member, a layer of elastomer bonded to said reinforcing ring and adapted to provide an elastomeric O.D. interference fit in a bore, and an annular elastomeric bumper member bonded to said reinforcing ring and extending axially outwardly into contact with an inner radial face of said radial flange of said wear sleeve member, and
(c) said sealing member being movable axially, with respect to said wear sleeve member, away from and out of contact with said wear sleeve member with said sealing lip being slidable axially off of said wear surface for disassembling said two part, separable, semi-unitized shaft seal.

65. The seal according to claim 64 wherein said layer of elastomer includes a plurality of circumferential, spaced-apart ridges with a valley between each pair of ridges.

66. The seal according to claim 65 wherein said ridges are adapted to be compressed more than 50% in height when installed in a bore.

67. The seal according to claim 64 wherein said sealing element is a leather sealing element.

68. The seal according to claim 67 wherein said reinforcing ring includes a cylindrical flange and a radial flange extending radially inwardly from the axially outer end of said cylindrical flange and also including an inner ring having a radial portion extending radially inwardly from adjacent the axially inner end of said cylindrical flange of said reinforcing ring and a radially inwardly and axially outwardly tapered flange extending toward said radial flange of said reinforcing ring and into contact with said leather sealing element, and wherein said axially inner end of said cylindrical flange of said reinforcing ring is crimped over against said inner ring for holding it in place, and including a garter spring for urging said sealing lip into contact with said wear surface, said garter spring being in contact with an O.D. surface of said sealing element and an outer radial face of said radial flange of said inner ring.

69. A seal according to claim 67 wherein said at least one bumper ring comprises two, concentric, radially spaced-apart rings.

70. A seal according to claim 69 wherein said layer of elastomer includes a plurality of circumferential, spaced-apart ridges with a valley between each pair of ridges.

* * * * *